Jan. 25, 1927.  1,615,538
E. H. EHRMAN ET AL
SLOTTING MACHINE
Filed April 21, 1923   6 Sheets-Sheet 5

Witness
Martin H. Olsen.

Inventors
Edwin H. Ehrman and
Webster D. Corlett.

Jan. 25, 1927.                                                              1,615,538
E. H. EHRMAN ET AL
SLOTTING MACHINE
Filed April 21, 1923        6 Sheets-Sheet 6

Witness
Martin H. Olsen.

Inventor
Edwin H. Ehrman and
Webster D. Corlett.
By Geo. E. Waldo
Atty.

Patented Jan. 25, 1927.

1,615,538

UNITED STATES PATENT OFFICE.

EDWIN H. EHRMAN AND WEBSTER D. CORLETT, OF OAK PARK, ILLINOIS, ASSIGNORS TO STANDARD SCREW COMPANY, OF JERSEY CITY, NEW JERSEY, A CORPORATION OF NEW JERSEY.

SLOTTING MACHINE.

Application filed April 21, 1923. Serial No. 633,619.

This invention relates to machines for slotting metal pieces.

The object of the invention is to provide an improved machine for the purpose specified, and to this end a machine embodying our invention and improvements comprises the various features, combinations of features hereinafter described and claimed.

In the accompanying drawings, in which our invention is fully illustrated—

Our improved machine is of the type in which slotting of the blanks is effected by means of saws.

In the accompanying drawings, we have for purposes of clear and definite illustration shown our invention and improvements as embodied in a machine for slotting castellated nuts. This particular use or application is merely illustrative, and we do not desire to limit ourselves thereto, as skilled mechanics can readily adapt our improved machine for slotting a wide range of different metal parts or pieces. For purposes of convenient reference, the nuts or other pieces to be slotted will be designated generally as "blanks"—both in the specification and claims.

Referring now to the drawings, A designates generally the frame of the machine, which will be made of cast iron, and $a$, $a^1$, $a^2$, the slotting saws mounted therein in the manner presently described.

During the slotting operation, the blanks to be slotted, designated 1, are supported upon a table 2 formed on the upper end of a plunger 3 fitted to a bearing formed in a hub or boss 4 supported within the main frame of the machine by arms 5 which connect said frame and boss. Said plunger 3 is secured against rotation in its bearing, being preferably splined thereto, as shown at 6, and, in operation, a substantially vertical up and down movement is imparted thereto towards and from the slotting tools—specifically slotting saws—designated respectively $a$, $a^1$, $a^2$.

Figure 3:
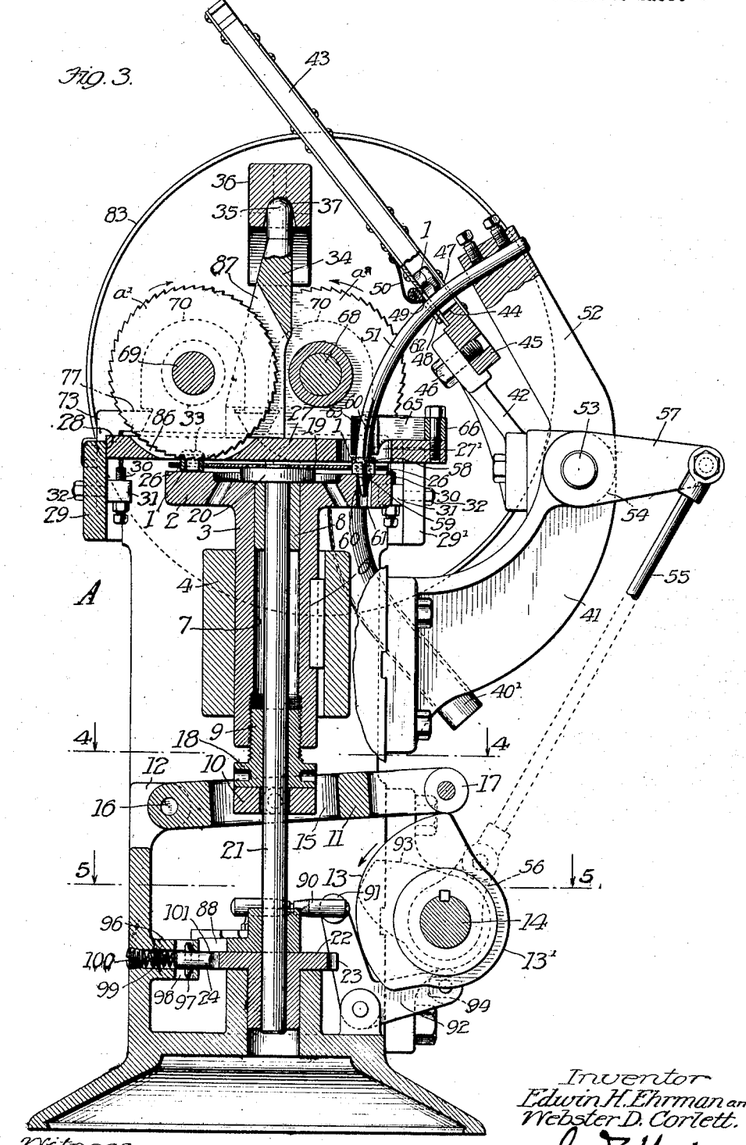
Figure 3 is a sectional elevation on the line 3—3 of Fig. 1, showing the blank supporting table and associated parts at the upper limit of their movement.
Figure 4:
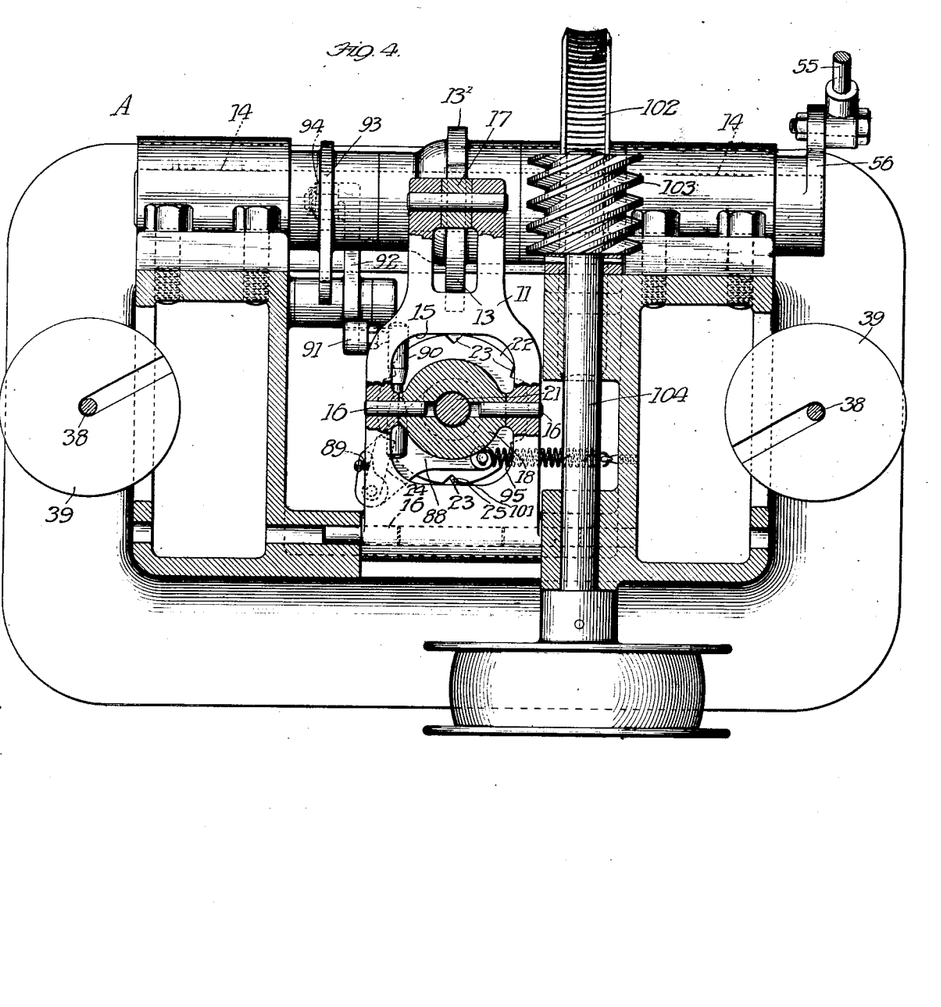
Figure 4 is a sectional plan view on the line 4—4 of Fig. 3.
Figure 5:
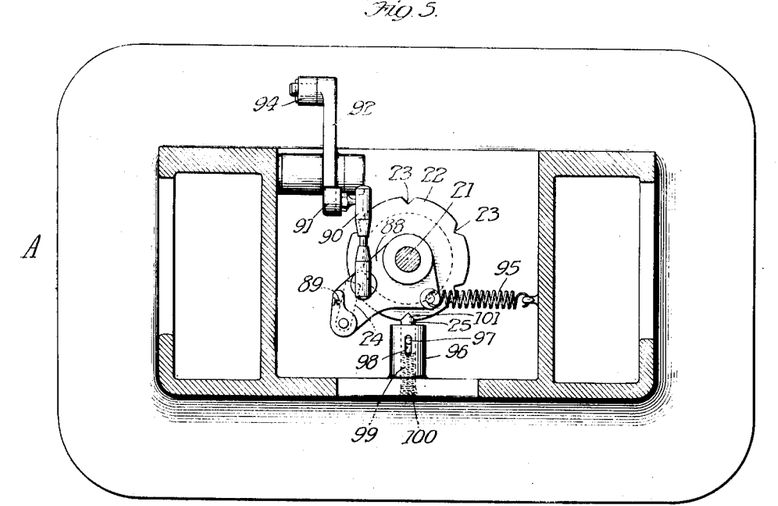
Figure 5 is a plan section on the line 5—5 of Fig. 3.
Figure 6:
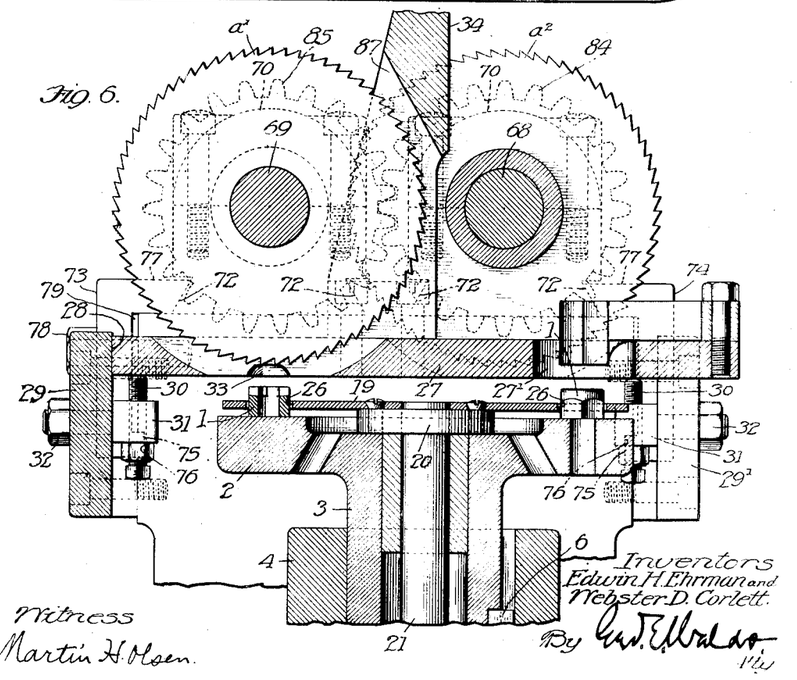
Figure 6 is an enlarged, sectional elevation of the slotting mechanism proper, similar to Fig. 3, but showing the blank supporting table and associated parts at the lower limit of their movement.

In the preferable construction shown, said plunger and table are supported and actuated in the following manner:—Extending through said plunger and table is a hole 7 secured in the upper and lower ends of which are bushings 8 and 9, the lower bushing 9 preferably having screw-threaded engagement with the hole 7 in said plunger and its lower end resting on a collar 10 pivoted to a lever 11 one end of which is pivoted to lugs or bosses 12 on the machine frame and the opposite end of which rests on a cam 13 secured to a cam shaft 14, mounted in suitable bearings in the machine frame, to which rotation in the direction indicated by the arrow, Fig. 3, is adapted to be imparted in the manner presently described.

As shown, the collar 10 is pivoted in a hole or opening 15 formed in the lever 11 by pins 16 and mounted in the outer end of said lever is an anti-friction roller 17, which is adapted to run in contact with the tread of the cam 13.

The screw-threaded engagement of the bushing 9 with the hole in the plunger 3 affords convenient means for varying the adjustment of the blank-supporting table 2 relative to slotting saws. To provide relatively large bearing surfaces for supporting the table 2 and plunger 3, the collar 10 is made considerably larger than the bushing 9 and a head 18 of the same size as the collar 10 is formed on said bushing. Spanner holes formed in the head 18 afford convenient means for turning said bushing, which may be secured in adjusted position by a set screw or other means, not shown.

Associated with the blank-supporting table 2 and the mechanism for raising and lowering the same is a part, which for convenient reference, we will designate the blank-feeding carrier, adapted for supporting the blanks 1 upon said table at equal angular distances apart and for imparting step by step movement thereto on said table in a path concentric with the axis thereof, the relation being such that during periods of rest of the indexing mechanism, the blanks will be positioned directly beneath the slotting saws.

As shown, said blank-feeding carrier consists of a sheet metal plate 19 secured to a head 20 formed on the upper end of a shaft 21 which is fitted to bearings formed in the bushings 8 and 9 secured in the bore of the plunger 3, keyed or otherwise secured to the lower end of which so as to rotate therewith, is a disk 22 formed in the perimeter of which are angular notches 23 adapted to be engaged by an actuating pawl 24 and a retaining pawl 25 which are supported and are adapted to be actuated to impart step by step rotation to the ratchet disk 22 and thus to the shaft 21 and the blank-feeding carrier 19 by means presently described.

Formed in the blank-feeding carrier 19 are openings 26, which are arranged at equal angular distances from each other and form a series concentric with the axis of rotation of the shaft 21 to which the carrier plate 19 is secured. The openings 26 conform to the exterior shape of the blanks 1 and to prevent said blanks from catching and sticking in said openings 26, they are preferably made slightly larger than said blanks.

As shown, the blanks are designed to receive three slots which extend at angles of 60° to each other, this being effected by providing six blank receiving openings 26 arranged at angles of 60° from each other and three slotting tolls—specifically saws—arranged at angles of 120° from each other in position to operate on alternate blanks.

While being slotted, the blanks 1 are adapted to be held firmly in place by suitable means consisting, as shown, of a clamping plate 27 supported upon the machine frame so as to be freely movable vertically with said table 2 and the blank-feeding carrier 19. As shown, also, said clamping plate 27 is confined in an opening 28 formed in the frame of the machine, being formed partly directly in the top of the machine frame and partly in a separate bar 29 and separate pieces 29' detachably secured to the main frame of the machine.

The lowermost position of the clamping plate 27 is defined by means of stops, said stops being preferably adjustable to adapt the machine for operating on nuts or blanks of different thickness. As shown, said stops consist of screws 30 threaded through lugs 31 on the machine frame adapted to be secured in adjusted positions by means of lock nuts 32, in a familiar manner.

The clamping plate 27 is fitted to the opening 28 in the top of the machine frame with sufficient clearance to permit said plate to move up and down freely in said opening, said clamping plate resting upon and being supported by blanks 1 resting on the table 2 and confined in the openings in the carrier 19, when there are blanks in the machine, or the stops 30 when the table 2 and carrier plate 19 are at the lower limit of their movement.

In order that the blanks 1 shall be slotted symmetrically, means are preferably provided for accurately positioning or "centering" the blanks relative to the slotting saws, when presented thereto. In accordance with our invention, this is effected in a simple manner by means of recesses 33 formed in the under side of the clamping plate 27, the sides of which converge upwards symmetrically to the axes thereof, said recesses registering accurately with the openings 26 in the blank-feeding carrier 19, when in positions of rest between rotary actuations thereof.

Also, to insure effective clamping action of the plate 27 on blanks while being slotted, said plate is cut away between the slotting saws so that blanks supported upon the blank-supporting table in positions intermediate said saws, will sustain no pressure from said clamping plate. As shown, the cut-away portions of said plate consist of holes 27' formed in said plate and extend entirely through said clamping plate. We do not, however, desire to limit ourselves to this or any particular form of holes or openings as our invention contemplates cutting away the clamping plate 27 in any manner adapted to relieve the blanks from pressure when in positions intermediate the slotting saws. When the machine is equipped with three slotting saws, the construction shown has a particular advantage in the respect that the blanks will be subjected to a uniform clamping action of full designed intensity during the slotting operation.

To insure that the blanks 1 will be held firmly in position during the slotting operation, pressure means are applied to the clamping plate 27. As shown, said pressure means are as follows:—Secured to said clamping plate is a standard 34 the upper end of which is rounded, as shown at 35, and supported on which is an equalizing bar 36 formed in the under side of which is a recess 37 adapted to receive the rounded upper end of the standard 34.

The equalizing bar 36 is made of such length that its ends will extend beyond the sides of the column of the main frame of the machine and suspended from the ends thereof, by means of rods 38 are weights 39, said weights being applied at equal distances from the point of suspension of said equalizing bar, and consisting preferably of the usual slotted type of scale weight, whereby the pressure of the clamping plate 27 may be increased or decreased as desired by varying the number of said scale weights. In order that the pressure on the different blanks on which the machine is operating shall be uniform, the rounded upper end 35 of the standard 34 is concentric with the axis of rotation of the shaft 21 and of the blank-feeding carrier 19. We do not, however, desire to limit ourselves to the particular means shown for weighting the clamping plate 27, as other and equally effective means for weighting or applying pressure to said plate will readily suggest themselves to others.

Also, as an equivalent construction, our invention contemplates the substitution of springs for the weights 39, for exerting pressure upon the clamping plate 27.

In the operation of the machine, blanks may be deposited upon the blank-supporting table 2 by hand or by suitable mechanism for the purpose, such deposit occurring during intervals of rest between successive rotary actuation of the blank carrier 19 and while the slotting operation on blanks in the machine is progressing—that is, while the blank-supporting table 2 is executing the extreme upper portion of its movement—and blanks on which the slotting operation has been finished are adapted to be discharged from the machine through a hole 40 in the blank-supporting table 2 between the slotting saw $a^2$ and the hole 27' formed in the clamping plate 27 between said saw $a^2$ and the saw $a$, which communicates with a spout or chute 40', the blanks falling by gravity into the opening 40 and being conducted by said chute or spout to a desired point of deposit, blanks when deposited upon the blank-supporting table 2 are inserted into the openings 26 in the carrier plate 19 through the hole 27' in the clamping plate 27 between the slotting saws $a, a^2$.

In the drawings we have shown mechanical means adapted for removing blanks from a tube in which they are contained and for depositing them upon the blank-supporting table 2, the construction and operation of said means being as follows:—The operative parts of the mechanism are mounted upon brackets 41 and 42, of which the bracket 41 is secured to the frame A of the machine and the bracket 42 is secured directly to the bracket 41. As shown, said bracket 42 forms a separate part and is bolted or otherwise rigidly secured to the bracket 41.

Supported in fixed position at the upper end of the bracket 42 is a tube 43, the upper end of which is open and the lower end of which is closed by a projection 44 forming the end of a block 45 removably secured to the outer end of the bracket 42, said projection 44 being fitted to the lower end of the tube 43 and said tube being secured thereto by means of screws 46 or the like.

In the construction shown, the blanks 1 are adapted to be deposited into the upper end of the tube 43 by hand, but our invention contemplates equally the use of mechanical means for this purpose, preferable means for the purpose consisting of the sorting machine which forms the subject-matter of U. S. Letters Patent No. 1,411,169, dated March 28, 1922.

In practice, the blanks 1 are deposited into the tube 43 in the position indicated, said tube being so proportioned that they cannot turn therein, and formed in opposite side walls of said tube adjacent to its lower end are holes or openings 47 and 48 which are so positioned that they will register with the hole formed in the lowermost blank in said tube.

The hole or opening 48 extends flush with the inner sides of the tube, other than those in which the holes 47 and 48 are formed, and also with the upper end of the projection 44 exposed within said tube, so that there will be no shoulders or ledges within the tube 43 at the edges of said opening 48 on which the blanks can catch. The blanks are adapted to be removed from the tube 43 through the hole or opening 48, said hole or opening being normally closed by means of a pivoted shutter 49 which is maintained yieldingly closed by a spring 50 applied thereto.

In the preferable construction shown, the means for removing the blanks from the tube 43 consist of a rod 51 secured in the outer end of an arm 52 on a stub shaft 53 rotatably mounted in a bearing formed in a sleeve 54 at the outer end of the bracket arm 41.

In operation, oscillating movement is adapted to be imparted to the stub shaft 53 from the cam shaft 14 by suitable driving connection therewith, consisting, as shown, of a link 55 which connects a crank arm 56 on said cam shaft with a lever arm 57 on said stub shaft, said lever arm 57 being sufficiently longer than the crank arm 56 so that turning movement of said crank arm through a complete circle will impart oscillating movement to the lever arm 57 through a predetermined arc, oscillation of said stub shaft operating to impart endwise movement to the pivoted arm 52 and to the rod 51 secured therein in opposite directions.

The rod 51 is bent on the arc of a circle described from the axis of rotation of the stub shaft 53 as a centre, and is supported in such position relatively to the carrier plate 19, that during intervals of rest between step by step actuations of said plate, a hole 26 therein will be in the path of movement of the end of said rod 51, and the mechanism for reciprocating said rod and the indexing mechanism for said plate are so timed that said rod will execute the extreme lower portion of its movement while said carrier plate is at rest—that is, as regards its indexing movement—passing into and being retracted from said holes during such periods of rest; and said carrier plate 19 will be indexed while the rod 51 is retracted from engagement with the holes 26 therein.

In delivering the blanks 1 from the tube 43 to the table 2, said blanks are adapted to be secured to the end of the rod 51 by light, frictional engagement therewith, their position relative to the end of said rod to attain the contemplated operation of the mechanism, being defined by a shoulder 58 formed on said rod adjacent to its outer end, said shoulder being preferably formed by reducing the extreme end portion 59 of said rod designed to enter the holes in said blanks to a diameter substantially equal to the diameter of the holes in said blanks, and to provide necessary frictional engagement of the blanks with the reduced end portion 59 of the rod 51 to retain them in position thereon, the outer end of said rod is slotted, as shown at 60, forming resilient prongs which are spread apart so that the slotted end of said rod will be slightly larger than the holes in the blanks. Also, to provide for compressing the spread prongs at the end of said rod, its extreme end is tapered as shown at 61. Thus, as the slotted end of said rod enters the hole in a blank, it will be compressed by engagement of the tapered end 61 thereof with the sides of the hole in the blank, the resilience of the prongs at the slotted end of said rod providing the necessary frictional engagement of the blanks with the end of said rod to retain them in position on said rod while being transferred from the tube 43 to the blank-supporting table 2. Also, to effect engagement of the slotted end portion 59 of the rod 51 with the holes in the blanks 1 before said blanks are removed from the tube 43, the spring 50 applied to the pivoted shutter 49 for closing the same, must be sufficiently strong to compress the slotted end of said rod so as to effect at least partial engagement thereof with the holes in said blanks. To provide for necessary pivotal movement of the shutter 49 to permit blanks to be removed from the tube 43 through the hole or opening 48 in the wall of the tube 43, a slot 62 is formed in the outer end of said shutter adapted to receive the rod 51.

When the bottom blank in the tube 43 is removed therefrom by the rod 51, the blank immediately above said bottom blank will fall by gravity until it rests upon the rod 51 on which it will ride until said rod is withdrawn so as to clear the bore of the tube 43, whereupon the column of blanks in said tube will fall, bringing another blank into position for engagement by the advancing end of said rod at the beginning of the succeeding reciprocation thereof.

To insure that the blanks removed from the tube 43 by the rod 51, will be deposited upon the table 2, means are preferably provided, in association with said rod, for stripping the blanks off from said rod as it is retracted.

As shown, said stripping means comprises a pair of jaws 63 and 64 supported in the path of movement of the rod 51 so as to yield relatively to each other, between which the rod 51 and a blank 1 supported on the end thereof will pass, as said rod, carrying said blank, passes downwardly from the tube 43 to the lower limit of its movement. As shown, the adjacent sides of said stripper jaws 63 and 64 conform generally to the exterior shape of the blanks on which the machine is operating and converge downwardly, the opening between said jaws being larger than the exterior dimensions of said blanks at their upper ends, and smaller than said blanks at their lower ends thus, as a blank carried by said rod passes between said stripper jaws, it will first spring said jaws apart until said blank passes below said jaws, whereupon said jaws will spring together so that their lower edges will extend over the top of said blank. Thus, as said rod is retracted, a blank thereon will strike the lower edges of the stripper jaws 63 and 64, which will operate, in an obvious manner, to force said blank off from the end of said rod. As shown, also, said stripper jaws 63 and 64 are positioned in such close proximity to the indexing plate 19, that the top sides of the blanks 1 will contact with the lower edges of said stripper jaws while the lower ends of said blanks are still in engagement with the holes 26 in said carrier plate, thus insuring delivery of said blanks in proper position on the supporting table 2, in the manner contemplated.

In the preferably construction shown, the stripper jaws 63 and 64 are stamped from sheet steel strips 65. the rear ends of which are secured to the sides of a block 66 secured in fixed position on the clamping plate 27 by a screw 67.

We do not, however, desire to limit ourselves to the particular form of stripper jaws shown, as the construction of said jaws may be variously modified within the scope and contemplation of our invention and other forms of stripper jaws suitable for the purpose will readily suggest themselves to mechanics skilled in the art.

As shown, our improved machine comprises three slotting saws—designated $a$, $a'$, $a^2$—mounted on the machine frame in position to form three different slots in each blank, extending at angles of 60° to each other. The number and arrangement of the saws may, however, be varied so as to form any number of slots in the blanks, arranged in any manner desired.

The saws, $a$, $a'$, $a^2$ are secured to arbors 68 and 69 rotatably mounted in suitable bearings above the clamping plate 27, the saws $a$, $a^2$ being secured in spaced relation on the arbor 68 and the saw $a'$ being secured to the arbor 69. As shown, said arbors are mounted parallel with each other and the bearings therefor are formed in head stocks 70 and tail stocks 71, supported on the top of the column of the machine frame at opposite sides of the opening 28 therein, in which the clamping plate 27 is confined.

In the preferable construction shown, both the head stocks 70 and tail stocks 71 are secured to the machine frame so as to be adjustable in the direction of the lengths of the saw arbors 68 and 69, thus providing for adjusting the positions of the slotting saws relatively to the blanks to be slotted. As shown, the head and tail stocks 70 and 71 are secured to the frame of the machine by means of dovetail slide bearings 72, and are adapted to be clamped in desired adjusted positions by means of clamping bars 73 and 74 applied to said head and tail stocks, respectively, all of which comprise ribs 75 at their lower ends adapted to engage grooves 76 formed in the machine frame and flanges 77 at their upper ends formed at the inner edges of which are the outer dovetail bearings for mounting the head and tail stocks 70 and 71 on the machine frame. The bars 73 and 74 are secured to the frame of the machine by means of bolts 78 which extend through holes therein and have screw threaded engagement with holes formed in the machine frame. The ribs 76 and the flanges 77 formed at the lower and upper ends, respectively, of the bars 73 and 74, are made of such length that between said ribs and flanges clearance spaces 79 will be formed between the side of the machine frame and the adjacent sides of the bars 73 and 74, the ribs 75 forming fulcrums about which the bars 73 and 74 will tend to turn when the screws 78 are tightened, thus drawing the dovetail bearings 72 on the flanges 74 at the upper edges of said bars into strong frictional engagement with the opposed dovetail bearing on the head and tail stocks 70 and 71, and clamping them rigidly in position, in the manner desired.

Our invention, however, contemplates equally forming the head and tail stocks 70 and 71 integral with the main frame of the machine, and in providing spacing collars 80 of different thicknesses on the saw arbors 68 and 69 for securing the slotting saws on said saw arbors in proper positions.

As shown, the slotting saws $a$, $a'$, $a^2$, and spacing collars 80 are secured to the saw arbors by clamping them between heads 81 formed on said arbors adjacent to the head stocks 70, and clamping nuts 82 threaded to the outer ends thereof.

Rotation is adapted to be imparted to the saw arbors 68 and 69 and thus to the slotting saws $a$, $a'$, $a^2$ secured thereto, by driving connection with a source of power, not shown. As shown, said saw arbors are adapted to be driven by means of a bolt applied to a pulley 83 secured to the saw arbor 68, and spur gears 84 and 85 secured to said saw arbors, respectively. With the described construction, it is obvious that the saw arbors will rotate in opposite direction, the relation being preferably such that the slotting saws will rotate in the direction indicated by the arrows in Fig. 3.

To permit the slotting saws $a$, $a'$, $a^2$ to come into contact with the blanks 1 supported in the machine, slots 86 are formed in the clamping plate 27 which extends through said plate and cut into the recesses 33 formed in the under side of said plate, for centering the blanks 1. Likewise, a slot 87 is formed in the standard 34 which supports the equalizer bar 36, adapted to receive the saw $a'$.

As shown, the actuating pawl 24 for imparting step by step rotation to the ratchet plate 22 secured to the lower end of the shaft 21, is supported and oscillating movement imparted thereto by means as follows:—Said actuating pawl 24 is pivoted to a plate 88 pivoted upon the shaft 21 directly above the ratchet disk 22, and is adapted to be forced inwardly so as to engage the notches 23 by means of a spring 89 applied thereto. In the operation of the machine oscillation is imparted to the plate 88 by means of a pitman 90, one end of which is pivoted to said plate and the other end to the arm 91 of a bell-crank lever, the other arm 92 of which rides on a cam 93 secured to rotate with the cam shaft 14. As shown, an anti-friction roller 94 mounted at the end of the arm 92 of the bell-crank lever, runs on the tread of said cam 93. As shown, also, the pitman 90 is connected both to the plate 88 and to the bell-crank lever 91 by means of universal ball joints, thus permitting said pitman to adjust itself freely to varying positions of said plate 88 and bell-crank lever arm 91, relative to each other.

The plate 88 on which the actuating pawl 24 is mounted is maintained yieldingly retracted against the force of the cam 93 by a spring 95 which connects said plate 88 with a rigid part of the machine frame.

The retaining pawl 25 is fitted to a bearing in a boss 96 on the machine frame so as to be movable endwise therein, said retaining pawl being maintained in engagement with its bearings by means of a pin 97 secured therein, the ends of which engage slots 98 formed in the boss 96. A spring 99 inserted between the inner end of said retaining pawl and a plug 100 threaded to the outer end of the hole forming the bearing for said retaining pawl, is adapted to effect engagement of said retaining pawl with the notches 23 in the ratchet disk 22, and disengagement of said pawl from said notches is adapted to be effected automatically as said ratchet disk is rotated by tapering the end of said retaining pawl as shown at 101, and forming the sides of the notches 23 on a corresponding angle, the relation being such that the component of force produced by rotation of the ratchet disk 22 by the pawl 24 will be sufficient to overcome the pressure of the spring 99 and to force said pawl out of engagement with the notches in said ratchet disk.

In the preferable construction shown, rotation is adapted to be imparted to the cam shaft 14 in the direction indicated by the arrow in Fig. 3, by a worm drive comprising a worm gear 102 secured to said cam shaft and a worm 103 secured to a worm shaft 104 rotatably mounted in bearings in the machine frame, to which rotation is imparted from any suitable source of power. As shown, said worm shaft is belt driven, but our invention contemplates equally gearing said shaft to the means for driving the saw arbors 68 and 69.

The cam 13 for raising and lowering the table 2 and the cam 93 for imparting step by step rotation to the ratchet disk 22 are so positioned on the cam shaft 14 relatively to each other—that is are so timed—that rotary actuation of the spacing and indexing plate 19 will occur when the blank-supporting table 2 is at the lower limit of its movement, that is while the anti-friction roller 17 mounted on the lever 11 traverses the small circular section 13' of the cam 13, in which position of said blank-supporting table, the blanks supported thereon will be entirely below and disengaged from both the slotting saws and the clamping plate 27, so that they will be free to move with the carrier plate 19.

Figure 1:
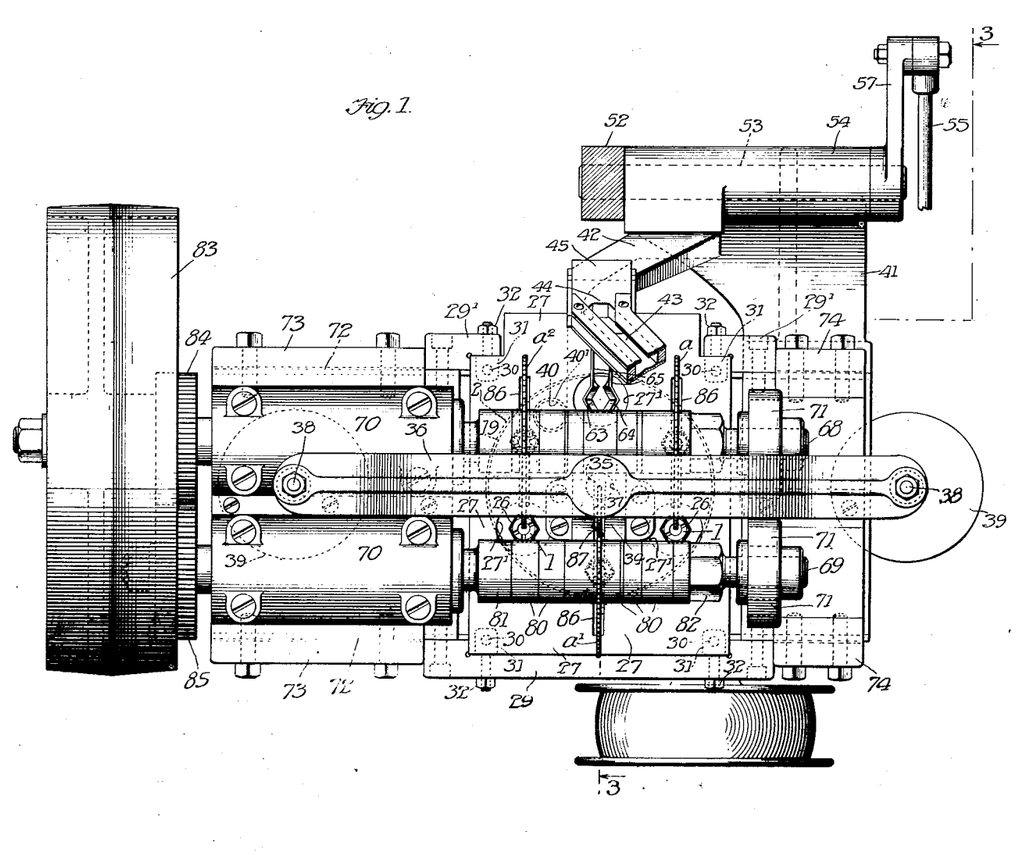
Figure 1 is a top plan view of a slotting machine embodying our invention and improvements.
Figure 2:
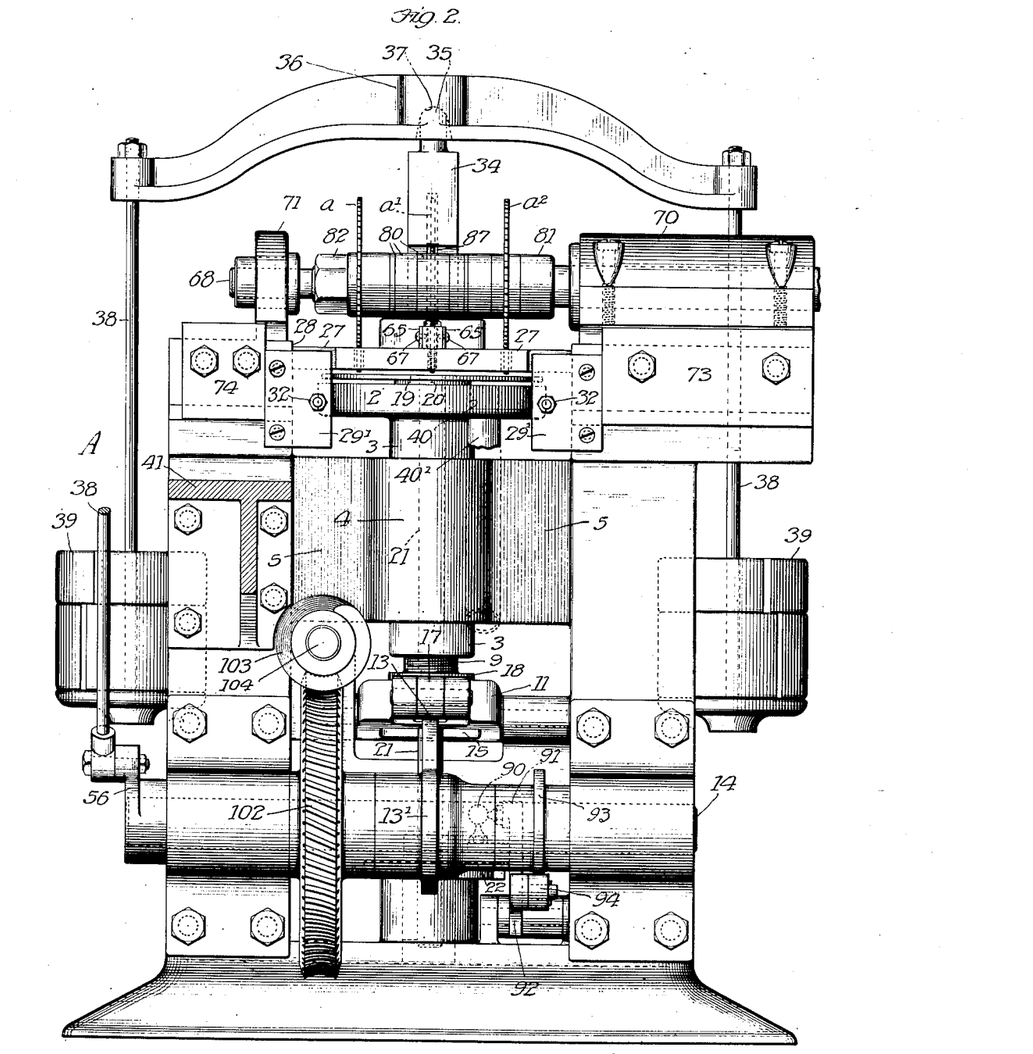
Figure 2 is a side elevation thereof taken from the right hand side of Fig. 3.

Beginning with the blank-supporting table 2 and parts associated therewith in their extreme raised positions, shown in Fig. 1 of the drawings, which corresponds to completion of the slotting operation, the operation of our improved machine is as follows:—As the cam shaft 14 and cam 13 rotate, said table 2 and parts carried thereby will fall by gravity, downward movement of the clamping plate 27 being limited by the stop screws 30—which also define its lowermost position. Downward movement of the table 2 with the blanks 1 and the carrier plate 19 will, however, continue until the antifriction roller 17 mounted at the end of the lever 11 runs onto the small circular portion 13' of the cam 13, which defines the lowermost position of said table 2 and of the carrier plate 19, in which the blanks 1 supported on said plate will be entirely below the clamping plate and the slotting saws and free to move with said carrier plate.

Similarly, the crank arm 56 by which oscillating movement is imparted to the lever arm 52 which carries the rod 51 for transferring blanks from the tube 43 to the blank-supporting table 2, is secured to the cam shaft 14 in such position that the blanks will be delivered upon said table and the rod 51 withdrawn from engagement therewith, while said table is at or adjacent to the upper limit of its movement, and while the carrier plate 19 is in positions of rest, that is as regards rotary actuation thereof. With this relation it is obvious that, as the rod 51 is retracted, the tops of the blanks 1 will be in such position relatively to the stripper jaws 63 and 64 that said stripper jaws will disengage said blanks from the end of said rod 51 as it is retracted, leaving them in the openings 26 in the carrier plate 19, in the desired manner.

Figure 7:
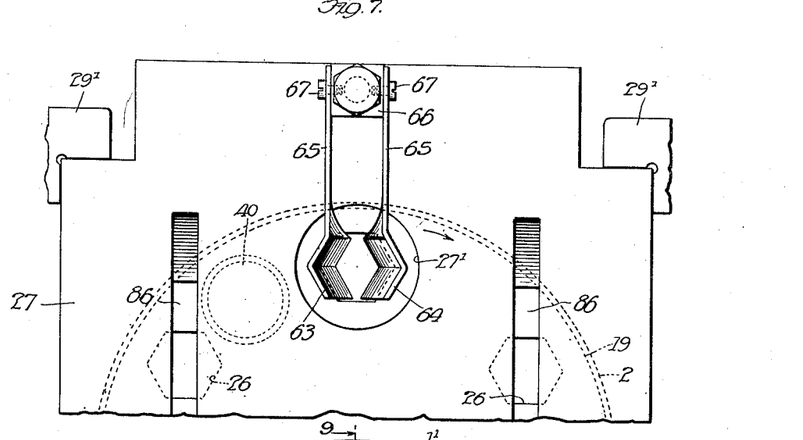
Figure 7 is an enlarged top plan view illustrating certain details and relations.

In operation, rotation is imparted to the carrier plate 19 in the direction indicated by the arrow, Fig. 7, together with the blanks 1 confined in the openings 26 therein, and said blanks are operated upon by the slotting saws $a$, $a'$ and $a^2$, in succession. After the final slotting operation has been performed thereon by the saw $a^2$, said blanks are discharged from the machine, falling by gravity through the hole 40 and the chute or spout 40', as heretofore described.

While we consider the machine shown in the drawings and heretofore described, as embodying our invention in its preferable form, we do not desire to limit ourselves thereto, as, in view of our disclosure, various modifications thereof as regards structural details, will readily suggest themselves to persons skilled in the art.

For example, instead of mounting the saw arbors in fixed bearings on the machine frame, our invention contemplates equally a construction in which said saws are mounted so as to be bodily movable with reference to the blank-supporting table and parts associated therewith. Also, instead of mounting the saw arbors parallel with each other or mounting a plurality of saws on one arbor, our invention contemplates mounting all of the saws on separate arbors arranged in any desired angular relation.

As still another departure from the particular construction shown, our invention contemplates mounting the saw arbors in such manner that the tail stocks are entirely dispensed with.

In like manner, the specific form of the blank feeding carrier and the means for mounting the clamping plate are immaterial and may be variously modified within the scope of our invention.

Changes such as those specified are within the province of the skilled mechanic and can be made without the exercise of invention and it is, therefore, believed that to show and describe the same would merely render the specification unnecessarily long without contributing to a clearer understanding of the invention.

One such modification has particular reference to the blank-feeding carrier and has for its objects:—To render said carrier sufficiently strong to withstand abnormal stresses produced therein by the slotting action of the saws, due to sticking or binding thereof, as sometimes happens, or other causes; to more accurately center the blanks with reference to the slotting saws, than is practicable with the form of blank-feeding carrier shown and described in connection with the preferable embodiment of our invention, owing to the tendency of the blanks to turn axially in the openings in the blank-feeding carrier in which they are confined, produced by frictional engagement of said blanks with the stationary blank-supporting table when rotation is imparted to said carrier; and to provide for adjusting the size of the openings in the blank-feeding carrier in which the blanks to be slotted are confined, to adapt the machine for operating effectively on all sizes of blanks within the contemplated limits of the machine.

Figure 8:
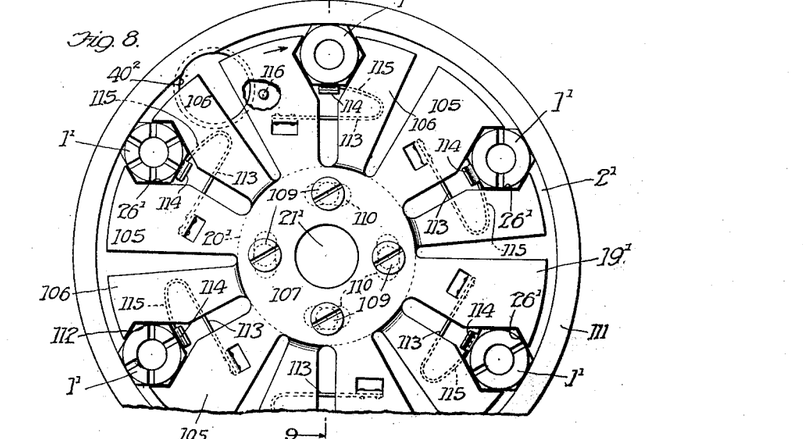
Figure 8 is a top plan view illustrating a modified form of blank-carrier.
Figure 9:
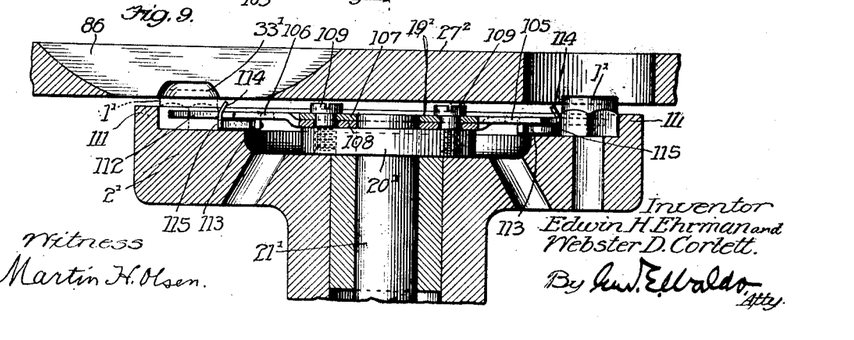
Figure 9 is a sectional side view on the line 9—9 of Fig. 8.

This modification is shown in Figs. 8 and 9 of the drawings, in which 1' designates the blanks to be slotted, 2' the blank-supporting table, 19' the blank-feeding carrier, as a whole, 20' the head on the indexing shaft 21' to which the blank-carrier is secured, 26' the openings formed in the blank-feeding carrier 19', 27² the clamping plate, 33' the recesses in the under side of said clamping plate for centering the blanks with reference to the slotting saws, and 40² the discharge opening for the finished blanks.

Excepting as hereinafter particularly described, all of the foregoing parts are substantially identical in construction with corresponding parts of the preferable embodiment of our invention heretofore described, and will be readily understood from such prior description in connection with the drawings illustrating the same, without a description thereof in detail.

In accordance with said modification, the blank-feeding carrier 19' consists of arms 105, 106. which project outwardly from center portions 107, 108, secured to the head 20', so as to be angularly adjustable, thus rendering the arms 105, 106 adjustable towards and from each other. As shown, the arms 105, 106 are arranged alternately, the arms 106 being bent upwardly into the spaces between adjacent arms 105, so that said arms 105, 106 will be in substantially the same plane.

Also, said arms 105, 106 are so proportioned that their adjacent edges will be separated by spaces of proper width to permit desired angular adjustment of said arms relatively to each other.

As shown, the center portions 107, 108, of the blank-carrier 19', are secured to the head 20' by screws 109 which extend through concentric slots 110 formed therein, respectively, and have screw threaded engagement with holes formed in said head, said slots being made of proper length to permit desired adjustment of the center portions 107, 108, of the blank-carrier 19' and thus of the arms 105, 106, relative to each other.

The ends of the arms 105, 106 are made circular and substantially concentric with the indexing shaft 21' and formed on the blank-supporting table 2' is a ring 111 which surrounds the outer ends of said arms and is spaced a short distance therefrom, say one sixteenth of an inch.

The openings 26' in the blank-carrier 19' in which the blanks 1' are confined are formed by notches 112 formed in adjacent sides of the arms 105, 106, said notches being shaped to conform to the exterior shape of the blanks which they are intended to receive, and the relation being such that the outer sides of blanks confined in the openings 26' formed by the notches 112 will rest in contact with the inner surface of the ring 111 on the blank-supporting table 2'.

In the preferable construction shown, also, the blanks 1' are adapted to be held yieldingly with their outer sides in contact with the ring 111 by means of light springs 113, shown as secured to the arms 105. In order that the springs 113 shall not obstruct the openings 26' and prevent the deposit of blanks to be slotted therein, said springs preferably comprise a bevelled portion 114 formed on their upper edges in position for engagement by a blank 1' when deposited into the openings 26', the relation being such that as said blanks pass into engagement with said openings, they will force the ends of the springs inwardly so that they will engage the inner sides of said blanks with a slight pressure sufficient to force and hold said blanks into contact with the ring 111.

Preferably, also, means are provided for relieving the pressure of the springs 113 on the blanks when the finished blanks are in position to be discharged, that is when they are over the discharge opening indicated at 40².

As shown, said springs 113 are adapted to be sprung inwardly so as to release the blanks, by means of an inward projection 115 on the ring 111, which is adapted to engage curved portions 116 formed at the outer ends of the springs 113 when the openings 26' are in register with the discharge opening 40².

As in the preferable form of the device, the blanks are adapted to be secured in slotting position by the clamping plate 27', provided in its under side with recesses 33' adapted for centering the blanks 1' relative to the slotting saws, the relation being such that the centering action of said recesses will retract the blanks 1' a very short distance inwards out of contact with the ring 111, the arms 105, 106 being adjusted so as to permit limited play of the blanks 1' in the openings 115.

We claim:

1. In a machine for slotting blanks, the combination of a frame, slotting saws and a non-rotatable blank-supporting table mounted on the machine frame so as to be movable relatively to each other, means for imparting relative movement thereto, means for rotating said saws, means for feeding blanks delivered upon said blank-supporting table to said saws, and means rendered effective by relative movement of said blank-supporting table and saws for holding blanks rigidly in position while being slotted and for releasing said blanks during the feeding operation.

2. A machine for slotting blanks as specified in claim 1, in which the blank feeding means comprises a carrier-plate rotatably mounted adjacent the blank-supporting table provided with openings adapted to receive blanks delivered upon the blank-supporting table, and means for imparting step by step rotation to said carrier-plate.

3. A machine for slotting blanks as specified in claim 1, in which the blank feeding means comprises a carrier-plate rotatably mounted adjacent the blank-supporting table provided with openings adapted to receive blanks delivered upon the blank-supporting table, means for imparting step by step rotation to said carrier plate, and means to prevent turning movement of said blanks in the openings in said carrier-plate.

4. A machine for slotting blanks as specified in claim 1, in which the blank feeding means comprises a carrier-plate positioned between the slotting saws and the blank-supporting table rotatably mounted upon said table, and means for imparting step by step rotation to said carrier-plate, said carrier-plate being provided with openings adapted to receive blanks delivered upon said table.

5. A machine for slotting blanks as specified in claim 1, in which the means for holding the blanks rigidly in position on the blank-supporting table while being slotted comprises a clamping plate mounted on the machine frame between the slotting saws and the blank-supporting table so as to be movable relative to said saws and blank-supporting table and adapted to bear upon blanks resting on said blank-supporting table while being slotted, and pressure means applied to said plate.

6. A machine for slotting blanks as specified in claim 1, in which the means for holding the blanks rigidly in position on the blank-supporting table while being slotted comprises a clamping plate mounted on the machine frame between the slotting saws and the blank-supporting table so as to be movable relative to said saws and blank-supporting table and adapted to bear upon blanks resting on said blank-supporting table during the slotting operation, and pressure means applied to said plate, said clamping plate being cut away between the slotting saws in such manner that blanks supported upon the blank-supporting table will be subjected to pressure by said clamping plate when in position to be slotted only.

7. A machine for slotting blanks as specified in claim 1, in which the means for holding the blanks rigidly in position on the blank-supporting table while being slotted comprises a clamping plate mounted on the machine frame between the slotting saws and the blank-supporting table so as to be movable relative to said saws and blank-supporting table and adapted to bear upon blanks resting on said blank-supporting table during the slotting operation, and pressure means applied to said plate, said clamping plate being constructed and arranged to accurately position blanks relative to the slotting saws when in slotting position.

8. A machine for slotting blanks as specified in claim 1, in which the means for holding the blanks rigidly in position on the blank-supporting table while being slotted comprises a clamping plate mounted on the machine frame between the slotting saws and the blank-supporting table so as to be movable relative to said saws and blank-supporting table and adapted to bear upon blanks resting on said blank-supporting table during the slotting operation, and pressure means applied to said plate, said clamping plate being provided with recesses formed in the side thereof adjacent the blank-supporting table the sides of which converge inwardly, said recesses being positioned and proportioned to engage blanks when in slotting position and to accurately position the same relative to the slotting saws.

9. A machine for slotting blanks as specified in claim 1, in which the means for holding the blanks rigidly in position on the blank-supporting table while being slotted comprises a clamping plate mounted on the machine frame between the slotting saws and the blank-supporting table so as to be movable relative to said saws and blank-supporting table and adapted to bear upon blanks supported on said blank-supporting table during the slotting operation, pressure means applied to said plate, and stops which limit the movement of the clamping plate away from the slotting saws, the relation being such that when the slotting saws and blank-supporting table are at the limit of their relative movement away from each other, the tops of blanks resting on the blank-supporting table will be below the side of the clamping plate adjacent to said blank-supporting table.

10. A machine for slotting blanks as specified in claim 1, in which the means for holding the blanks rigidly in position on the blank-supporting table while being slotted comprises a clamping plate mounted on the machine frame between the slotting saws and the blank-supporting table so as to be movable relative to said saws and blank-supporting table and adapted to bear upon blanks resting on said blank-supporting table during the slotting operation, and pressure means applied to said plate, said clamping plate being fitted to an opening formed in the machine frame with sufficient clearness to permit said plate to move freely in said opening.

11. A machine for slotting blanks as specified in claim 1, in which the means for holding the blanks rigidly in position on the blank-supporting table while being slotted comprises a clamping plate mounted on the machine frame between the slotting saws and the blank-supporting table so as to be movable relative to said saws and blank-supporting table and adapted to bear upon blanks resting on said blank-supporting table during the slotting operation, and a weight or weights applied to said clamping plate adapted to subject the same to pressure.

12. A machine for slotting blanks as specified in claim 1, in which the means for holding the blanks rigidly in position on the blank-supporting table while being slotted comprises a clamping plate mounted on the machine frame between the slotting saws and the blank-supporting table so as to be movable relative to said saws and blank-supporting table and adapted to bear upon blanks resting on said blank-supporting table during the slotting operation, and pressure means applied to said plate, comprising a standard on said plate, an equalizer bar supported on said standard and weights on said equalizer bar.

13. A machine for slotting blanks as specified in claim 1 comprising three slotting saws arranged equal angular distances apart and the blank feeding means and the means for holding the blanks rigidly in position while being slotted comprise a carrier-plate rotatably mounted adjacent the blank-supporting table provided with six openings adapted to receive blanks to be slotted delivered upon the blank-supporting table, and means for imparting step by step rotation to said carrier-plate through angles equal to one-half the angular distance between the slotting saws, a clamping plate mounted on the machine frame between the slotting saws and the blank-supporting table and adapted to bear upon blanks delivered upon said blank-supporting table while being slotted, and pressure means applied to said plate, said clamping plate being cut away between the slotting saws in such manner that blanks supported upon the blank-supporting table will be subjected to pressure by said clamping plate when in position to be slotted only.

14. A machine for slotting blanks as specified in claim 1, in which the blank-supporting table is mounted on the machine frame below the saws so as to be movable towards and from the same, and which comprises means for supporting said blank-supporting table and for imparting movement thereto towards and from said saws, the means for mounting the blank-supporting table comprising a plunger thereon fitted to a bearing formed in the machine frame so as to be movable endwise therein.

15. A machine for slotting blanks as specified in claim 1, in which the blank-supporting table is mounted on the machine frame below the saws so as to be movable towards and from the same, and which comprises means for supporting said blank-supporting table and for imparting movement thereto towards and from said saws, comprising a plunger thereon fitted to a bearing in the machine frame so as to be movable endwise therein, a pivoted lever, a collar pivoted thereto on which the lower end of the plunger of the blank-supporting table rests directly, a cam on which the free end of said lever rides, and means for rotating said cam.

16. A machine for slotting blanks as specified in claim 1, in which the blank-supporting table is mounted on the machine frame below the saws so as to be movable towards and from the same, and which comprises means for supporting said blank-supporting table and for imparting movement thereto towards and from said saws, comprising a plunger fitting to a bearing in the machine frame so as to be movable endwise therein, and a bushing adjustably secured in a hole in the lower end of said plunger, to which the actuating means for imparting reciprocating movement to said blank-supporting table is directly applied.

17. A machine for slotting blanks as specified in claim 1, in which the blank-supporting table is mounted on the machine frame below the saws so as to be movable towards and from the same, and which comprises means for supporting said blank-supporting table and for imparting movement thereto towards and from said saws, the means for mounting the blank-supporting table comprising a hollow plunger fitted to a bearing formed in the machine frame so as to be movable endwise therein, and the blank feeding means comprises a carrier-plate provided with openings adapted to receive the blanks deposited upon the blank-supporting table, a shaft fitted to bearings in the plunger of the blank-supporting table to which said carrier-plate is secured, and indexing means applied to said shaft adapted to impart step by step rotation thereto.

18. A machine for slotting blanks as specified in claim 1, which also comprises a tubular support adapted to contain the blanks to be slotted, and means for transferring blanks from said tubular support to the blank feeding means associated with the blank-supporting table.

In witness that we claim the foregoing as our invention, we affix our signatures this 31st day of March, 1923.

EDWIN H. EHRMAN.
WEBSTER D. CORLETT.